(12) United States Patent
Wu et al.

(10) Patent No.: US 12,386,468 B2
(45) Date of Patent: Aug. 12, 2025

(54) ELECTRODE STRUCTURE AND DISPLAY DEVICE

(71) Applicant: InnoLux Corporation, Miao-Li County (TW)

(72) Inventors: Yuan-Lin Wu, Miao-Li County (TW); Jui-Jen Yueh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/338,506

(22) Filed: Jun. 21, 2023

(65) Prior Publication Data
US 2024/0036690 A1 Feb. 1, 2024

(30) Foreign Application Priority Data
Aug. 1, 2022 (CN) .......................... 202210914368.3

(51) Int. Cl.
*G06F 3/045* (2006.01)
*G06F 3/044* (2006.01)

(52) U.S. Cl.
CPC .......... *G06F 3/0445* (2019.05); *G06F 3/0446* (2019.05); *G06F 2203/04107* (2013.01)

(58) Field of Classification Search
CPC ................. G06F 3/0445; G06F 3/0446; G06F 2203/04107; G06F 2203/04111; G06F 2203/04112; G06F 3/0443; G06F 3/147; H01L 27/156
See application file for complete search history.

(56) References Cited

U.S. PATENT DOCUMENTS

| | | | |
|---|---|---|---|
| 2013/0106746 A1* | 5/2013 | Lai | G06F 3/0412 29/850 |
| 2016/0202792 A1 | 7/2016 | Han | |
| 2017/0262096 A1 | 9/2017 | Kim | |
| 2018/0224984 A1 | 8/2018 | Kim | |
| 2018/0348937 A1* | 12/2018 | Pak | G06F 3/0446 |
| 2020/0043984 A1 | 2/2020 | Lee | |
| 2021/0200366 A1 | 7/2021 | Bok | |
| 2023/0037126 A1* | 2/2023 | Kim | H10K 59/131 |
| 2025/0089420 A1* | 3/2025 | Tang | H01L 25/167 |

FOREIGN PATENT DOCUMENTS

KR 20180005321 A * 1/2018

\* cited by examiner

Primary Examiner — Sahlu Okebato
(74) Attorney, Agent, or Firm — McClure, Qualey & Rodack, LLP

(57) ABSTRACT

An electrode structure is provided. The electrode structure includes a first layer and a second layer. The first layer has a first wire, a second wire and an isolated wire, wherein the first wire is electrically connected to the second wire, and the isolated wire is electrically insulated from the first wire and the second wire. The second layer is disposed on the first layer and has a third wire, wherein the third wire is electrically connected to the first wire. In a top view of the electrode structure, the isolated wire is disposed between the first wire and the second wire.

20 Claims, 7 Drawing Sheets

ELECTRODE STRUCTURE AND DISPLAY DEVICE

CROSS REFERENCE TO RELATED APPLICATIONS

This Application claims priority of China Patent Application No. 202210914368.3, filed on Aug. 1, 2022, the entirety of which is incorporated by reference herein.

BACKGROUND

Field of the Invention

The present invention relates to an electrode structure and a display device, and, in particular, to an electrode structure and a display device having an isolation wire that is electrically insulated from other wires.

Description of the Related Art

Thanks to technological developments, the use of electronic devices is very common nowadays. In particular, electronic devices with display functions have become an indispensable part of daily life. These electronic devices may have touch functionality. There may be an electrode structure disposed in the electronic device. However, there is still room for further improvements to current designs.

BRIEF SUMMARY

An embodiment of the present invention provides an electrode structure, which includes a first layer and a second layer. The first layer has a first wire, a second wire and an isolated wire, wherein the first wire is electrically connected to the second wire, and the isolated wire is electrically insulated from the first wire and the second wire. The second layer is disposed on the first layer and having a third wire, wherein the third wire is electrically connected to the first wire. In a top view of the electrode structure, the isolated wire is disposed between the first wire and the second wire.

An embodiment of the present invention provides a display device, which includes a display panel and an electrode structure disposed on the display panel. The electrode structure includes a first layer and a second layer. The first layer has a first wire, a second wire and an isolated wire, wherein the first wire is electrically connected to the second wire, and the isolated wire is electrically insulated from the first wire and the second wire. The second layer is disposed on the first layer and having a third wire, wherein the third wire is electrically connected to the first wire. In a top view of the electrode structure, the isolated wire is disposed between the first wire and the second wire.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
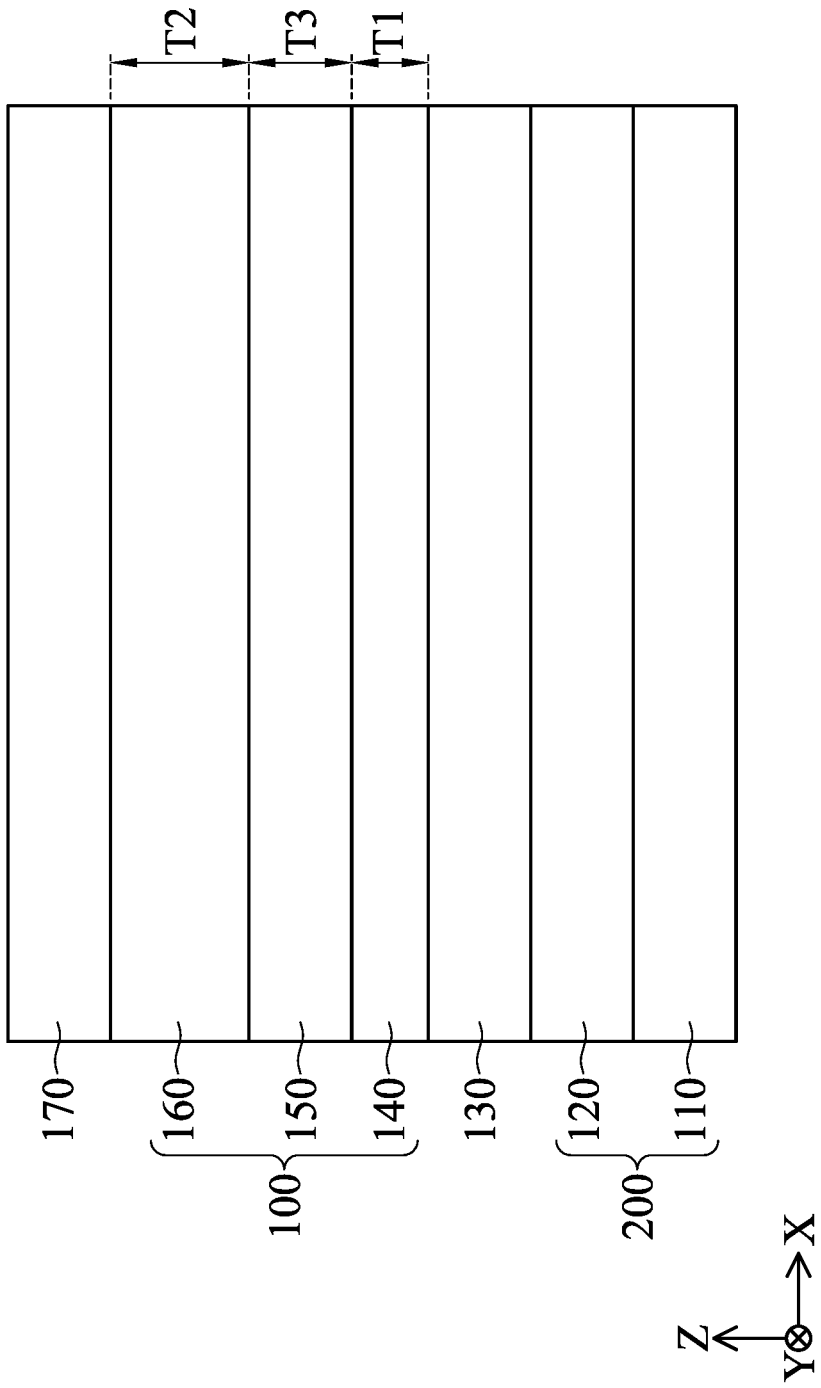
FIG. 1 shows a cross-sectional view of an electronic device in accordance with some embodiments of the present disclosure.

The present disclosure may be understood by referring to the following description and the appended drawings. It should be noted that, in order to make the reader easy to understand and make the drawings concise, the drawings in the present disclosure may illustrate a part of the light-emitting unit, and specific elements in the drawings are not drawn based on the actual scale. In addition, the number and the size of each component in the drawings merely serves as an example, and are not intended to limit the scope of the present disclosure. Furthermore, similar and/or corresponding numerals may be used in different embodiments for describing some embodiments simply and clearly, but not represent any relationship between different embodiment and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open words, so they should be interpreted as meaning "including but not limited to . . . ". Therefore, when terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (such as a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. The terms "about," "equal to," "equivalent," "the same," "essentially" or "substantially" are generally interpreted as within 20% of a given value or range, or as interpreted as within 10%, 5%, 3%, 2%, 1%, or 0.5% of a given value or range. In addition, the term "electrically connected" may be used below. It should be understood that if the present disclosure recites "the first element is electrically connected to the second element," it can be interpreted as that the first element and the second element are electrically connected to each other and can be synchronously controlled by single operation. The situation of "the first element and the second element are electrically connected to each other via other elements therebetween," or the situation of "the first element and the second element are directly electrically connected without other elements" may be considered as "electrically connected." When it is mentioned in the present disclosure that the first element is "directly electrically connected" to the second element, it refers to the situation that "the first element and the second element are directly electrically connected without other elements." In addition, the term "electrically insulated" may be used below. It should be understood that if the present disclosure states "the first element and the second element are electrically insulated," it may be interpreted as that the first element and the second element are electrically isolated without being connected to each other, nor synchronized controlled by single operation.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 shows a partial plan view of an electronic device 10 in accordance with some embodiments of the present disclosure. The electronic device 10 may include a display device, a backlight device, an antenna device, a sensing device or a splicing device, but the present disclosure is not limited thereto. The electronic device 10 may be a bendable or flexible electronic device. The display device may be a non-self-luminous display device or a self-luminous display device. The antenna device may be a liquid-crystal type antenna device or a non-liquid-crystal type antenna device. The sensing device may be a sensing device for sensing capacitance, light, thermal energy or ultrasonic waves, but the present disclosure is not limited thereto. In some embodiments, the electronic device 10 includes a flexible panel, and the flexible panel includes electronic components, which may include passive components and active components, such as capacitors, resistors, inductors, diodes, transistors, and the like. In some embodiments, the diodes may include light-emitting diodes or photodiodes. The light-emitting diodes may, for example, include organic light-emitting diodes (OLEDs), mini LEDs, micro LEDs or quantum dot LEDs, but the present disclosure is not limited thereto. The splicing device may be, for example, a display splicing device or an antenna splicing device, but the present disclosure is not limited thereto. It should be noted that the electronic device 10 may be any combination of the above-mentioned devices, but the present disclosure is not limited thereto. It should be understood that the content of the present disclosure will be discussed with respect to the partial structure of the electronic device 10 in the following paragraphs, and those skilled in the art should understand that the electronic device 10 may also include other structures to perform expected functions.

As shown in FIG. 1, the electronic device 10 may include an electrode structure 100 and a display panel 200, wherein the electrode structure 100 is disposed on the display panel 200. In some embodiments, the display panel 200 includes a substrate 110 and a device layer 120 disposed on the substrate 110. The substrate 110 may include at least one of a rigid substrate, a flexible substrate, or a combination thereof, but not limited thereto. The material of the rigid substrate may include glass, quartz, ceramics, sapphire, at least one of the above materials, a mixture of the above materials, other suitable materials, or a combination thereof, but not limited thereto. The material of the flexible substrate may include rubber, polymer materials such as polyimide (PI), polyethylene naphthalate (PEN), polycarbonate (PC), polyurethane, polydimethylsiloxane or/and polyethylene terephthalate (PET), at least one of the above materials, a mixture of the above materials, other suitable materials or a combination thereof, but not limited thereto. The device layer 120 may include a light-emitting unit, a thin film transistor (TFT) or any other suitable device or structure layer, but the present disclosure is not limited thereto. By selectively disposing various devices in the device layer 120, the electronic device 10 can perform expected functions. It should be understood that any possible configurations are within the scope of the present disclosure, and all possible configurations will not be listed one-by-one below.

In some embodiments, the electrode structure 100 includes a first layer 140, an insulating layer 150 and a second layer 160 that are sequentially stacked. The insulating layer 130 may be disposed between the device layer 120 and the electrode structure 100. For example, the insulating layer 130 may include a single-layered insulating material or a stacked structure of multi-layered insulating materials. The insulating material may include inorganic insulating materials or organic insulating materials. The inorganic insulating materials include, for example, silicon dioxide, silicon oxide, silicon nitride, alumina, silicon oxynitride or other suitable insulating materials. The organic insulating materials include, for example, acrylic resin or other suitable insulating materials. When the insulating layer 130 is a stacked structure of multi-layered insulating materials, the aforementioned insulating materials can be selected and arbitrarily arranged, for example, forming a multi-layered structure by alternating stacking of inorganic insulating materials and organic insulating materials. However, the present disclosure is not limited thereto. In some embodiments, the insulating layer 130 may be formed by chemical vapor deposition (CVD), spin coating, or any other suitable method, but this disclosure is not limited thereto. The first layer 140 may be disposed over the insulating layer 130. For example, the material of the first layer 140 may include copper, aluminum, tungsten, an alloy thereof, a combination thereof, or other metallic materials having good electrical conductivity. In other embodiments, the material of the first layer 140 may be a non-metallic material, as long as using the material with electrical conductivity, such as indium tin oxide (ITO). However, the present disclosure is not limited thereto. The first layer 140 may be formed by chemical vapor deposition, sputtering, evaporation, or any other suitable deposition methods, but the present disclosure is not limited thereto.

In addition, the insulating layer 150 may be disposed over the first layer 140. In some embodiments, the material and structure of the insulating layer 150 may be referred to the insulating layer 130, and therefore will not be repeated herein. The insulating layer 150 may be made of the same material as the insulating layer 130, and the insulating layer 150 and the insulating layer 130 may be formed in the same manner, but the present disclosure is not limited thereto. In other words, in some embodiments, the insulating layer 150 and the insulating layer 130 may include different materials and be formed in the same or different ways. The second layer 160 may be disposed over the insulating layer 150. In some embodiments, the material of the second layer 160 may be the same as that of the first layer 140, and the second layer 160 and the first layer 140 may be formed in the same manner, but the present disclosure is not limited thereto. In other words, in some embodiments, the second layer 160 and the first layer 140 may include different materials and be formed in the same or different ways. In some embodiments, the second layer 160 may cooperate with the first layer 140 to sense touch actions. The electrode structure of the second layer 160 will be further described below with reference to FIG. 2.

For example, in any cross-section of the electronic device 10, the first layer 140 may have a first thickness T1, the second layer 160 may have a second thickness T2, and the insulating layer 150 may have a third thickness T3. For example, the first thickness T1, the second thickness T2, and the third thickness T3 may be measured along a direction (i.e. the Z direction) that is approximately parallel to the stacking direction of the first layer 140, the insulating layer 150, and the second layer 160, and approximately parallel to the direction in which the electronic device 10 is viewed from above. However, the present disclosure is not limited thereto. In some embodiments, the first thickness T1 of the first layer 140 may be less than the second thickness T2 of the second layer 160. In some embodiments, the first thickness T1 of the first layer 140 may be less than the third thickness T3 of the insulating layer 150. In some embodiments, the ratio of the first thickness T1 to the second thickness T2 may be greater than or equal to 0.6 and less than 1 ($0.6 \leq T1/T2 < 1$). With the above features, the size of the electronic device 10 in the Z direction may be reduced, and/or the stable insulation of the electronic device 10 may be maintained, thereby reducing the risk of failure of the electronic device 10.

In addition, the electronic device 10 may further include a protective layer 170. The protection layer 170 may be disposed on the electrode structure 100 to protect the electrode structure 100. For example, the material, structure and formation method of the protective layer 170 may be referred to the insulating layer 130, and therefore will not be repeated herein. In some embodiments, the material of the protective layer 170 may be the same as that of the insulating layer 130 and the insulating layer 150, and the protective layer 170 and the insulating layer 130 and the insulating layer 150 may be formed in the same manner, but the present disclosure is not limited thereto. In other words, in some embodiments, the protective layer 170, the insulating layer 130, and the insulating layer 150 may include different materials and be formed in the same or different ways. However, the present disclosure is not limited thereto.

Figure 2:
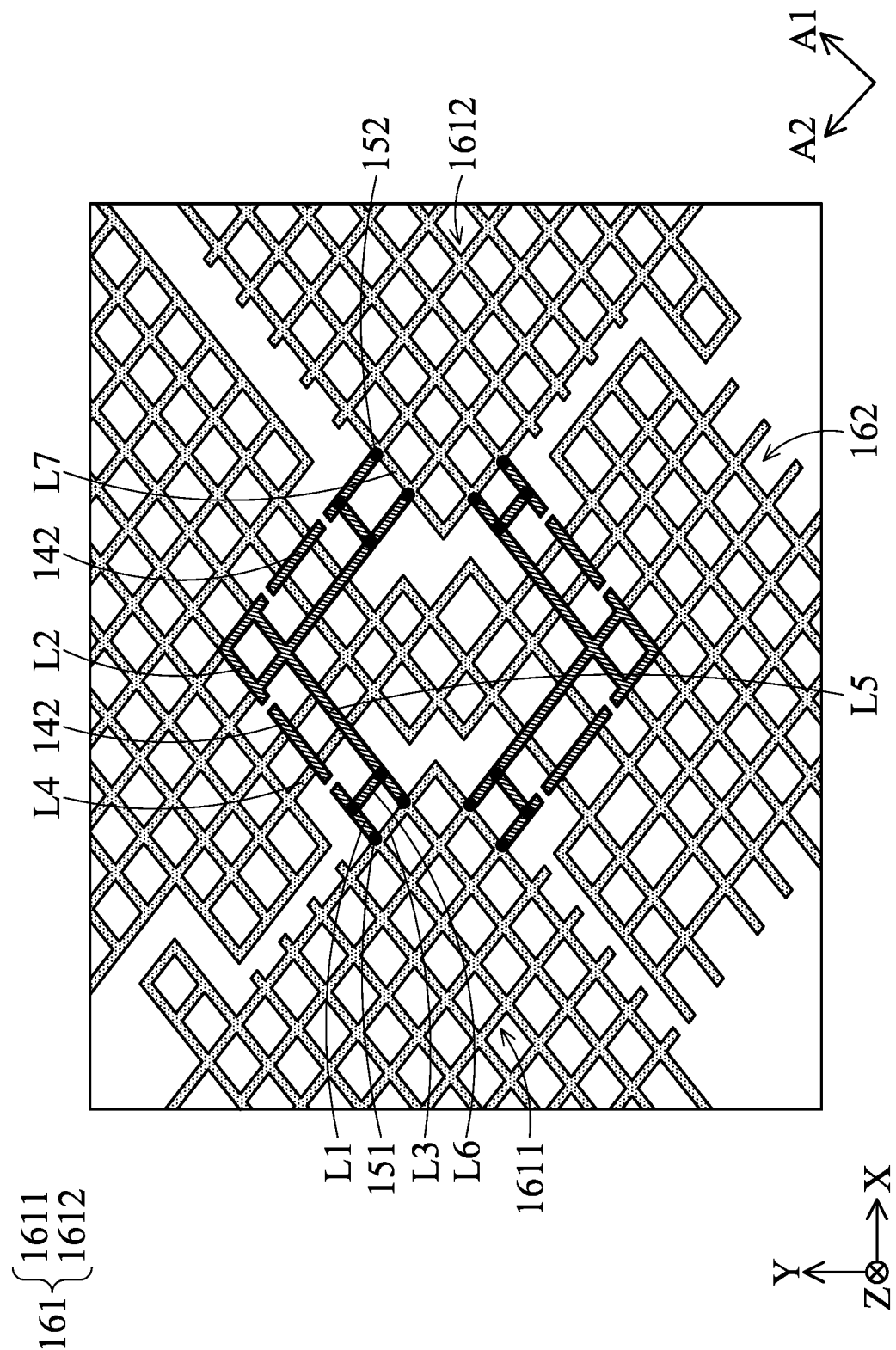
FIG. 2 shows a plan view of an electrode structure in accordance with some embodiments of the present disclosure.

FIG. 2 shows a top view of the electrode structure 100 in accordance with some embodiments of the present disclosure. It should be noted that in this embodiment, in order to further discuss the connection structure of the electrode structure 100, an exemplary partial area is illustrated. Those skilled in the art should understand that an appropriate insulating structure may be disposed between the shown connection structures to maintain the stability of the first layer 140 and the second layer 160 of the electrode structure 100 and reduce the risk that a short circuit occurring between the first layer 140 and the second layer 160 of the electrode structure 100. For example, the above-mentioned insulating structure may be an insulating material disposed between the first layer 140 and the second layer 160. The insulating material may be the insulating layer 150, and may be formed in the same manner as the insulating layer 130, but the present disclosure is not limited thereto. As shown in FIG. 2, the second layer 160 may include a first sensing electrode 161 and a second sensing electrode 162. In some embodiments, the first sensing electrode 161 and the second sensing electrode 162 may be separated from each other in a plan view and therefore electrically insulated. In some embodiments, the first sensing electrode 161 may include a plurality of mesh structures that are separated from each other, and among the mesh structures arranged in a direction (for example, the X direction), adjacent mesh structures (for example, the mesh structure 1611 and the mesh structure 1612 shown in FIG. 2) may be electrically connected to each other via the first layer and extend toward the X direction. The second sensing electrode 162 may include a plurality of mesh structures that are separated from each other (merely one mesh structure is shown in FIG. 2, though), and each mesh structure of the second sensing electrode 162 may be extend in another direction (for example, the Y direction) that is different from the X direction in which the adjacent mesh structures of the first sensing electrodes 161 are electrically connected and extend. However, the present disclosure is not limited thereto.

In addition, in some embodiments, the first layer 140 may have a first wire L1, a second wire L2, and an isolation wire 142, wherein the first wire L1 is electrically connected to the second wire L2, and the isolation wire 142 is electrically insulated from the first wire L1 and the second wire L2. In the top view of the electrode structure 100, the isolation wire 142 is disposed between the first wire L1 and the second wire L2, and is separated from the first wire L1 and the second wire L2. For example, the first wire L1 and the second wire L2 extend in the first direction A1 (which is, for example, between the X direction and the Y direction), and are separated from each other in the first direction A1. The extension direction of the isolation wire 142 is parallel to the first direction A1. For example, the extension direction of each wire may be defined by the connection direction of the two ends of each wire (such as the first wire L1, the second wire L2 or the isolation wire 142, etc.), and the same definition for the extension direction of each wire will be used in the following paragraphs, and therefore will not be repeated herein. The problem of signal interference between the first layer 140 and the second layer 160 may be improved by providing the isolation wire 142 electrically insulated from the first wire L1 and the second wire L2. It should be noted that, in the present disclosure, a wire (or a line) may be a portion extending substantially in a direction. Assuming that a structure includes two portions extending in different directions, for example, an L-shaped structure includes two portions extending approximately at a right angle, then this structure may be defined as two wires (or two lines).

In some embodiments, the mesh structure 1611 of the first sensing electrode 161 in the second layer 160 may have a third wire L3, the mesh structure 1612 may have a seventh wire L7, and the third wire L3 and the seventh wires L7 are separated from each other. The third wire L3 is electrically connected to the first wire L1, and the seventh wire L7 is electrically connected to the second wire L2. In some embodiments, in the top view of the electrode structure 100, the first wire L1 and the second wire L2 are disposed between the third wire L3 and the seventh wire L7, and the third wire L3 is electrically connected to the seventh wire L7 via the first wire L1 and the second wire L2. In other words, the mesh structure 1611 of the first sensing electrode 161 may be electrically connected to the mesh structure 1612 via the first layer 140. The second sensing electrode 162 in the second layer 160 may further have a fourth wire L4, the fourth wire L4 may intersect and therefore partially overlap with the isolation wire 142, and is electrically insulated from the isolation wire 142. In some embodiments, the second sensing electrode 162 may have a plurality of fourth wires L4 that are substantially parallel to each other, and at least two of the fourth wires L4 intersect and partially overlap with the isolation wire 142. In this way, with the above configuration, the visual uniformity of the electrode structure 100 may be optimized, or the effect of reducing noise interference between the first layer 140 and the second layer 160 may be improved.

In addition, the first layer 140 may further have a fifth wire L5 that is electrically connected to the first wire L1 and the second wire L2, and the extension direction (for example, the first direction A1) of the fifth wire L5 may be parallel to the extension directions (for example, the first direction A1) of the isolation wire 142. In some embodiments, the first layer 140 may further have a sixth wire L6 that is electrically connected to the first wire L1 and the fifth wire L5, and in the top view of the electrode structure 100, the sixth wire L6 is disposed between the third wire L3 and isolation wire 142. In some embodiments, the extension direction (for example, the second direction A2) of the sixth wire L6 is parallel to the extension direction (for example, the second direction A2) of the third wire L3. In some implementations, the extension direction (for example, the first direction A1) of the fifth wire L5 and the isolation wire 142 is substantially perpendicular to the extension direction (for example, the second direction A2) of the sixth wire L6 and the third wire L3. With the above configuration of the sixth wire L6, noise interference between the first layer 140 and the second layer 160 may be reduced, or visual uniformity may be optimized.

In some embodiments, the connection element 151 and the connection element 152 may be provided and formed in the insulating layer 150. For example, the connection element 151 may be disposed at the position where the first wire L1 and the third wire L3 overlap, the connection element 152 may be disposed at the position where the seventh wire L7 overlaps with another wire. Other connection elements may be disposed at the position where the first wire L1 and the sixth wire L6 overlap, the fifth wire L5 and the sixth wire L6 overlap, and the third wire L3 and the fifth wire L5 overlap, so as to electrically connect the above corresponding wires. In some embodiments, the material of the connection element 151 may be the same as that of the third wire L3, but the present disclosure is not limited thereto.

It should be understood that although the first direction A1 and the second direction A2 are defined in this embodiment, these directions are defined merely for the ease of explaining the directions of each structure, and do not represent any specific directional relationship themselves. In other embodiments, the first direction A1 and the second direction A2 may be any directions on the same plane (such as the X-Y plane) and substantially perpendicular to each other.

Figure 3A:
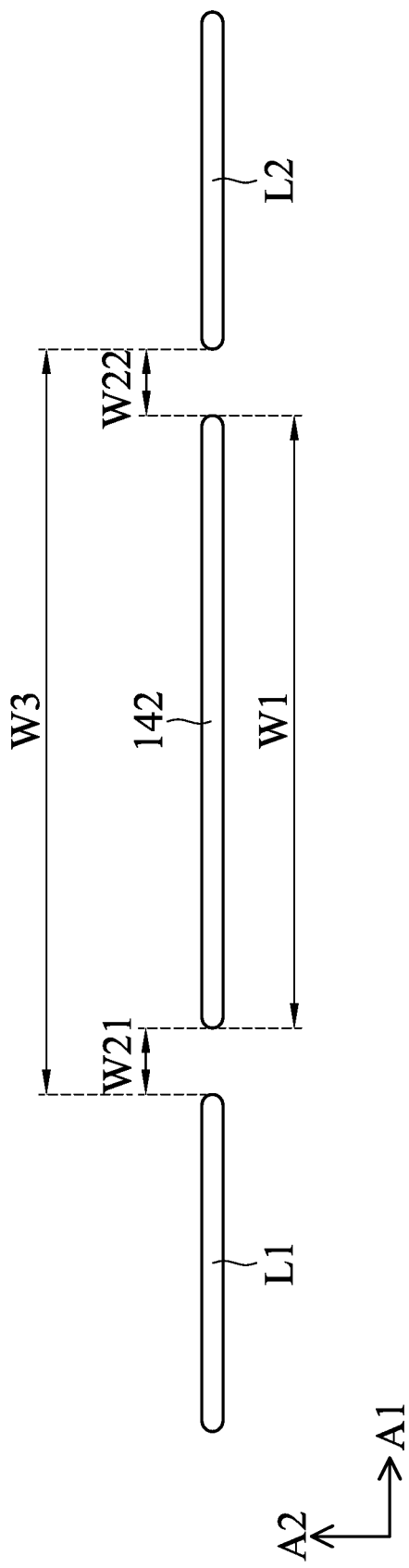
FIG. 3A shows a partial schematic view of the electrode structure in accordance with some embodiments of the present disclosure.

FIG. 3A shows a schematic partial top view of the electrode structure 100 in accordance with some embodiments of the present disclosure. As shown in FIG. 3A, in the extension direction (the first direction A1) of the first wire L1, the first wire L1 and the second wire L2 are separated by a distance W3 (that is, the distance between the opposite end points of the first wire L1 and the second wire L2), and the isolation wire 142 has a length of W1. The first wire L1 and the isolation wire 142 are separated by a distance W21, the second wire L2 and the isolation wire 142 are separated by a distance W22, and the length W1 of the isolation wire 142 is greater than the distance W21 and the distance W22. In some embodiments, the distance W21 and the distance W22 are the same, and in other embodiments, the distance W21 and the distance W22 are different. In addition, for example, the length W1, the distance W2, and the distance W3 may be measured in the direction substantially parallel to the first direction A1 (such as the extension direction of the first wire L1, the second wire L2, and the isolation wire 142), but the present disclosure is not limited thereto. In some embodiments, the ratio of the length W1 of the isolation wire 142 to the distance W3 may be greater than or equal to 0.5 and less than or equal to 0.96 ($0.5 \le W1/W3 \le 0.96$). In some embodiments, the ratio of the length W1 of the isolation wire 142 to the distance W3 may be greater than or equal to 0.7 and less than or equal to 0.92 ($0.7 \le W1/W3 \le 0.92$). As a result, visual uniformity may be optimized under acceptable manufacturing yields.

Figure 3B:
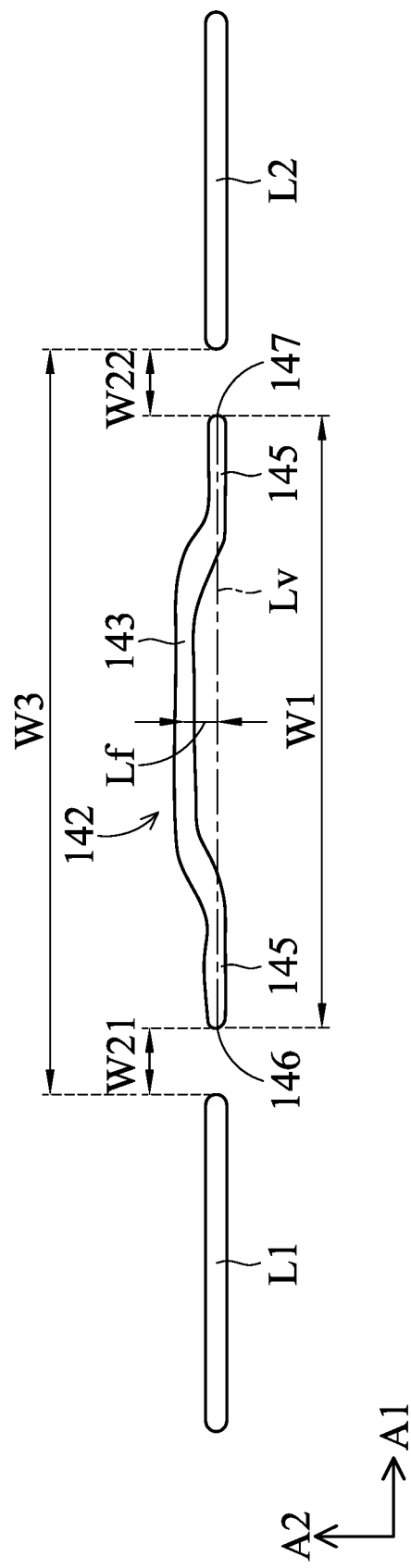
FIG. 3B shows a partial schematic view of the electrode structure in accordance with some other embodiments of the present disclosure.

FIG. 3B shows a partial schematic view of the electrode structure 100 in accordance with other embodiments of the present disclosure. As shown in FIG. 3B, the isolation wire 142 has two opposite edge portions 145 and a first portion 143 connected to the two opposite edge portions 145. The two edge portions 145 each have an end point 146 and another end point 147. In some embodiments, the end of the edge portion 145 that is not connected to the first portion 143 may have an arc profile, and the end points 146 (or the end points 147) are the apexes of the arc profile, respectively. Since the end of the edge portion 145 of the isolation wire 142 is designed to have an arc profile (such as a semicircle, but not limited thereto), the problem of electro static discharge (ESD) caused by charge accumulation at the tip may be reduced.

In addition, an imaginary line Lv may be formed to pass through the end point 146 and the end point 147. By drawing the imaginary line Lv, the extension direction of the isolation wire 142 can be defined (that is, the direction parallel to the imaginary line Lv, which is the first direction A1). For example, the length W1 of the isolation wire 142 may be the maximum length measured in the extension direction (i.e., the first direction A1) of the isolation wire 142, but the present disclosure is not limited thereto. In some embodiments, the first portion 143 of the isolation wire 142 between the end point 146 and the end point 147 is offset from the imaginary line Lv by a distance Lf. For example, the distance Lf may be the maximum distance between the first portion 143 and the imaginary line Lv, and may be measured in a direction (i.e., the second direction A2) that is substantially perpendicular to the imaginary line Lv, but the present disclosure is not limited thereto. In some embodiments, the distance Lf is greater than or equal to 1 μm and less than or equal to 8 μm (1 μm≤Lf≤8 μm). As a result, if the electronic device 10 includes a light-emitting unit, the position of the first portion 143 in the isolation wire 142 is adjustable to reduce the overlapping area of the first portion 143 and the light-emitting unit, so that the electronic device 10 may maintain a better display function. In some embodiments, the isolation wire 142 may have a bow profile in the top view of the electrode structure 100.

Figure 4:
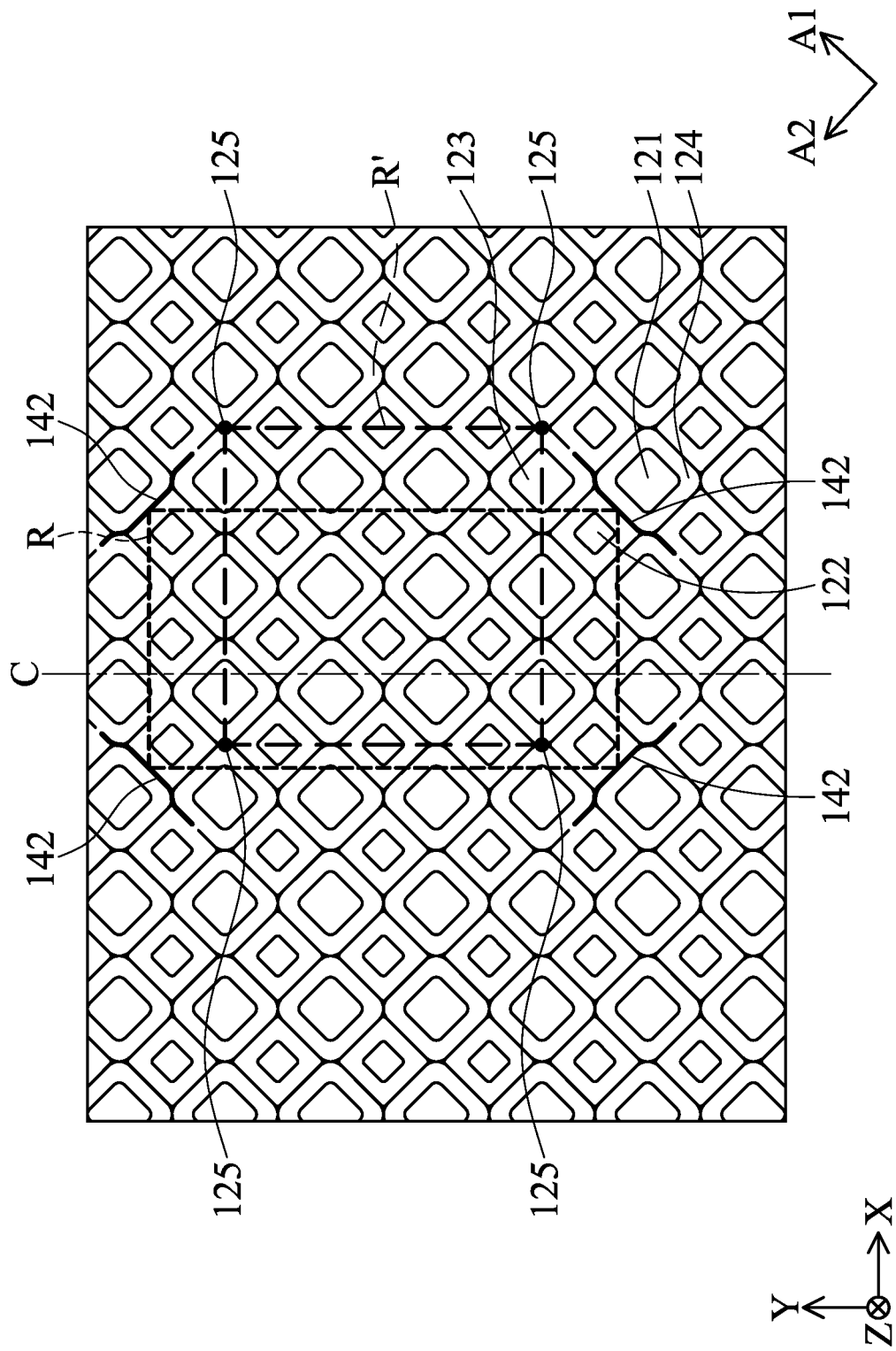
FIG. 4 shows a top view of the electronic device in accordance with some embodiments of the present disclosure.

FIG. 4 shows a top view of the electronic device 10 in accordance with some embodiments of the present disclosure. As shown in FIG. 4, the electronic device 10 (such as the device layer 120) may include a plurality of light-emitting units (such as the first light-emitting unit 121, the second light-emitting unit 122, and the third light-emitting unit 123 that are arranged in a staggered manner). The pixel definition layer 124 is disposed around the above light-emitting units, and the opening region of the pixel definition layer 124 defines the light-emitting regions of different sub-pixels to allow light emitted from the light-emitting units. For example, the above-mentioned light-emitting units may include light-emitting units of different colors or sizes, and all possible arrangements thereof are within the scope of the present disclosure.

In some embodiments, the connecting lines of the four isolation wires 142 may form an imaginary rectangle R. For example, referring to FIG. 2, the above four isolation wires 142 are the four isolation wires 142 in the first layer 140 electrically connected to the adjacent mesh structure 1611 and mesh structure 1612. In some embodiments, these four isolation wires 142 are referred to as four corresponding isolation wires 142 for simplicity of description. More specifically, the imaginary rectangle R can be drawn by connecting the center points of the four corresponding isolation wires 142. The first portions of these isolation wires 142 (for example, referring to the first portion 143 of FIG. 3B) may be offset towards the center of the imaginary rectangle R. The center of the imaginary rectangle R may be, for example, the intersection of the diagonals, but the present disclosure is not limited thereto. In other words, the four corresponding isolation wires 142 constituting the imaginary rectangle R may be concave relative to the center of the imaginary rectangle R. In some embodiments, if the electronic device 10 is bendable or folded along an axis (such as the C axis), the macro-axis of the imaginary rectangle R may be substantially parallel to the C axis, thereby reducing the stress generated when the electronic device 10 is bent or folded, which reduces the risk of damage to the electronic device 10 when it is bent or folded.

In addition, in some embodiments, a plurality of spacers 125 may be disposed in the electronic device 10, and configured to reduce the risk of damage to the electronic device 10 caused by the manufacturing apparatus during the manufacturing process. In the top view of the electronic device 10, the spacers 125 may be separated from the isolation wire 142. An imaginary rectangle R' can be drawn by connecting the center points of adjacent spacers 125, and the imaginary rectangle R' may at least partially overlap with the virtual rectangle R. As a result, the difficulty of manufacturing the electronic device 10 may be reduced, thereby improving the yield of the electronic device 10.

Figure 5:
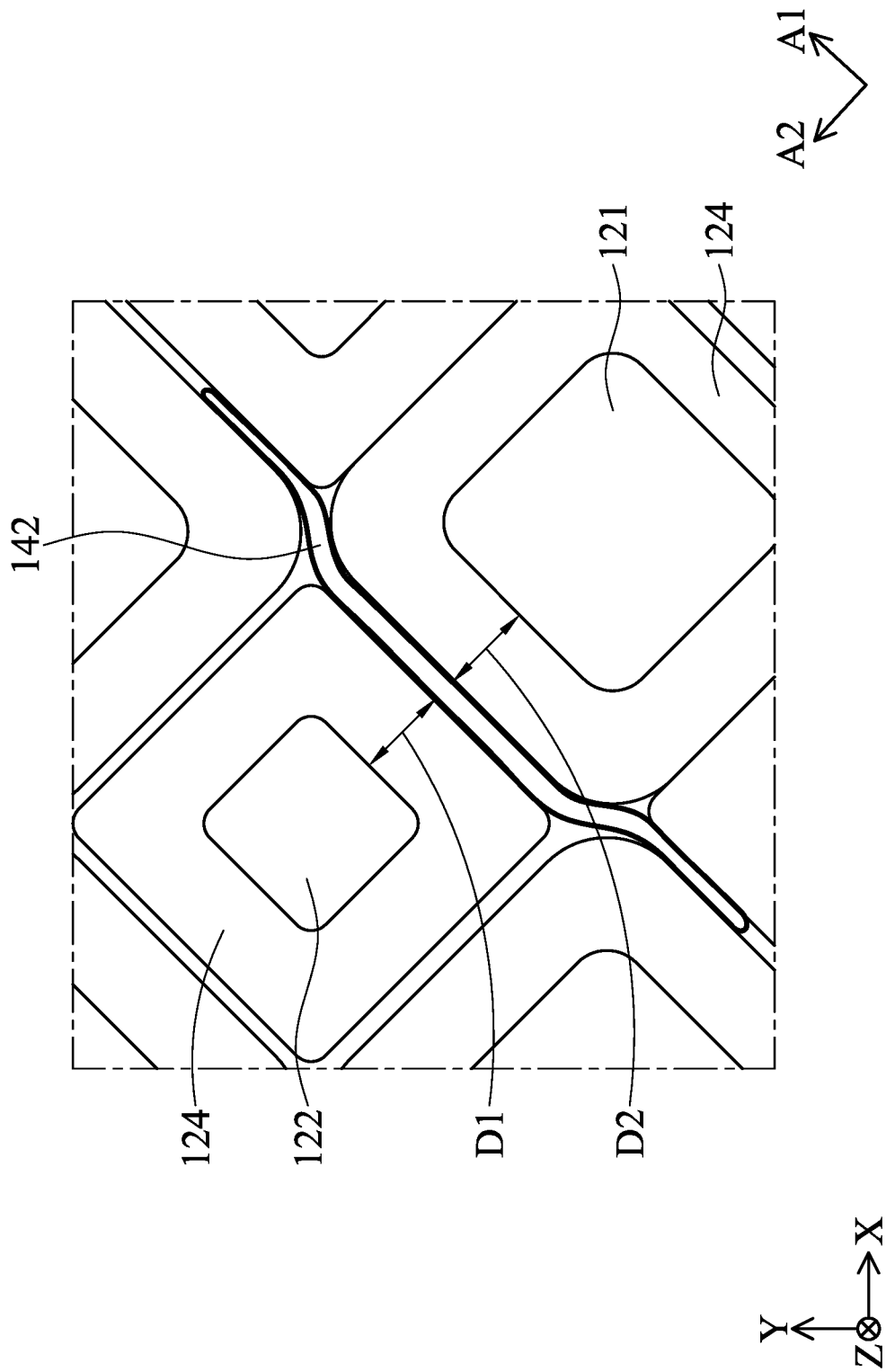
FIG. 5 shows a partial enlarged view of the electronic device in accordance with some embodiments of the present disclosure.

FIG. 5 shows a partially enlarged top view of the electronic device 10 in accordance with some embodiments of the present disclosure, for example, the lower right corner of the imaginary rectangle R in FIG. 4. As shown in FIG. 5, the isolation wire 142 may be disposed between the light-emitting region of the first light-emitting unit 121 and the light-emitting region of the second light-emitting unit 122, but the present disclosure is not limited thereto. In some embodiments, the ratio of the distance D1 between the isolation wire 142 and the light-emitting region of the second light-emitting unit 122 to the distance D2 between the isolation wire 142 and the light-emitting region of the first light-emitting unit 121 may be greater than or equal to 0.5 and less than or equal to 1.8 (0.5≤D1/D2≤1.8). As a result, the risk of the isolation wire 142 interfering with the light emitted by the first light-emitting unit 121 and/or the second light-emitting unit 122 can be reduced. In some embodiments, the distance D1 may be the shortest distance from the isolation wire 142 to the edge (for example, the junction of the second light-emitting unit 122 and the pixel definition layer 124) of the light-emitting region of the second light-emitting unit 122, and the distance D2 may be the shortest distance from the isolation wire 142 to the edge (for example, the junction of the first light-emitting unit 121 and the pixel definition layer 124) of the light-emitting region of the first light-emitting unit 121. For example, the distance D1 and the distance D2 may be measured in the second direction A2, but the present disclosure is not limited thereto.

Figure 6:
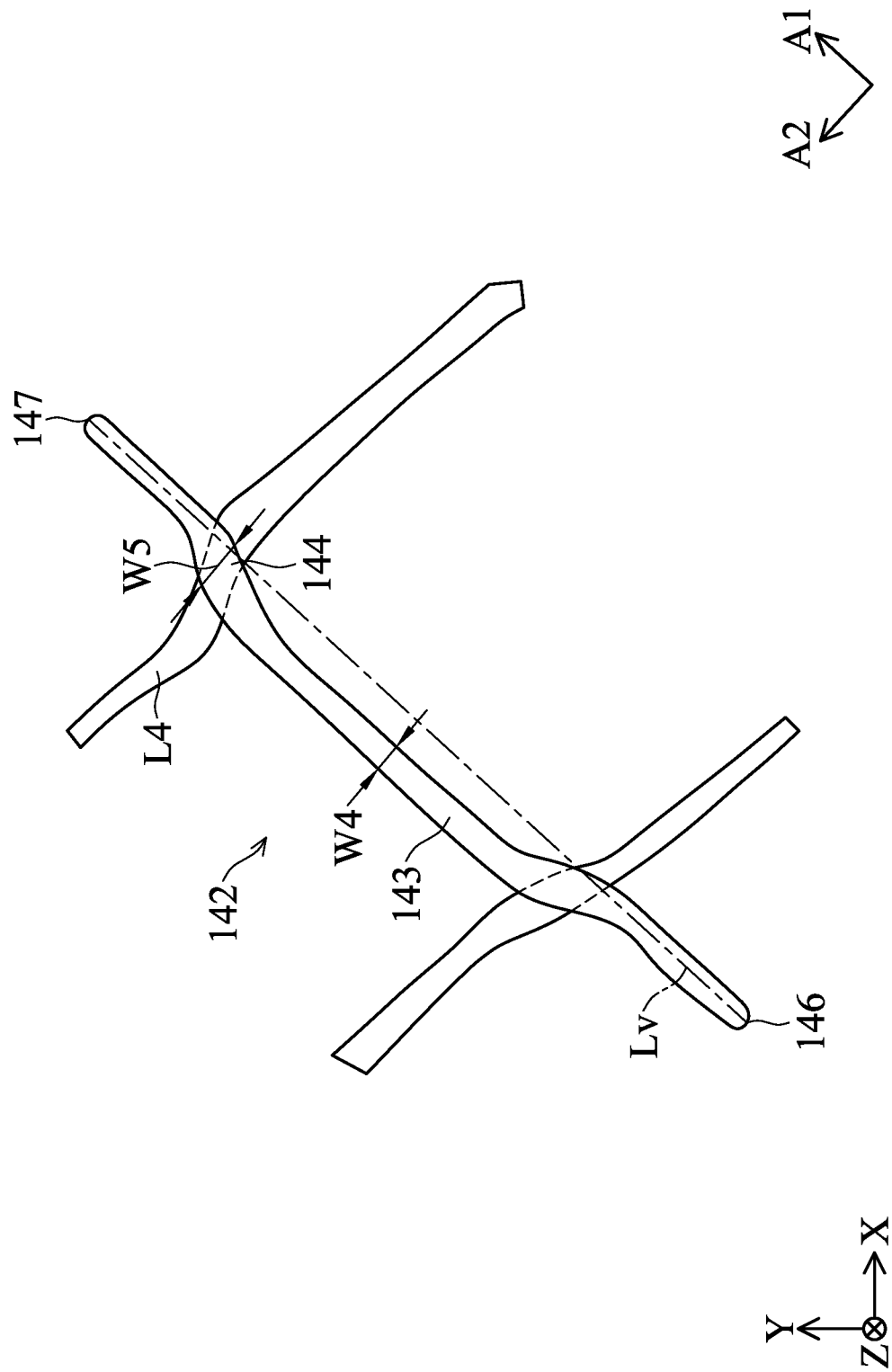
FIG. 6 shows a partial schematic view of the electrode structure in accordance with some embodiments of the present disclosure.

FIG. 6 shows a partial top view of the electrode structure 100 in accordance with some embodiments of the present disclosure. As shown in FIG. 6, the isolation wire 142 includes a first portion 143 that does not overlap with the fourth wire L4 and a second portion 144 that overlaps with the fourth wire L4, and the first portion 143 may be connected to the edge portion 145 via the second portion 144 (for example, referring to FIG. 3B). In some embodiments, the width W5 of the second portion 144 is greater than the width W4 of the first portion 143. In some embodiments, the width W5 of the second portion 144 and the width W4 of the first portion 143 may be measured in a direction that is perpendicular to the imaginary line Lv (for example, the second direction A2), but the present disclosure is not limited thereto. In some embodiments, the ratio of the width W4 of the first portion 143 to the width W5 of the second portion 144 may be greater than or equal to 1 and less than or equal to 2 (1≤W4/W5≤2). As a result, the charge density at the intersection of the isolation wire 142 and the fourth wire L4 may be reduced, thereby reducing the risk of electrostatic discharge. On the other hand, visual uniformity may also be optimized.

It should be understood that although the above-mentioned embodiments merely illustrate the configuration of the electrode structure and the display panel, those skilled in the art should be able to arrange other optical layers and/or optical elements in the structure discussed in the present disclosure to enhance the display and/or touch control effect based on the context of this disclosure. These configurations derived from the present disclosure are also included within the scope of the present disclosure.

In summary, the embodiments of the present disclosure provide an electrode structure and a display device including isolation wires that are electrically insulated from the wires. By setting the isolation wires, noise interference in the display device may be reduced, or visual uniformity may be optimized. In addition, the shape and configuration of the isolation wires are also adjustable, so that the isolation wires are less likely to interfere with the light output of the display device or reduce the problem of electrostatic discharge.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An electrode structure, comprising:
   a first conductive layer having a first conductive wire, a second conductive wire and a fourth conductive wire, wherein the first conductive wire is electrically connected to the second conductive wire, and the fourth conductive wire is electrically insulated from the first conductive wire and the second conductive wire; and
   a second conductive layer disposed on the first conductive layer and having a third conductive wire, wherein the third conductive wire is electrically connected to the first conductive wire,
   wherein in a top view of the electrode structure, the fourth conductive wire is disposed between the first conductive wire and the second conductive wire.

2. The electrode structure as claimed in claim 1, wherein the first conductive wire and the second conductive wire extend along a first direction and are separated from each other in the first direction, and an extension direction of the fourth conductive wire is parallel to the first direction.

3. The electrode structure as claimed in claim 2, wherein the first conductive wire and the second conductive wire are separated by a first distance, and the ratio of a length of the fourth conductive wire to the first distance is greater than or equal to 0.5, and less than or equal to 0.96.

4. The electrode structure as claimed in claim 3, wherein the ratio is greater than or equal to 0.7 and less than or equal to 0.92.

5. The electrode structure as claimed in claim 1, wherein the third conductive wire is electrically connected to the first conductive wire via a connection element, and a material of the third conductive wire is the same as a material of the connection element.

6. The electrode structure as claimed in claim 1, wherein in the top view of the electrode structure, the fourth conductive wire has a bow profile.

7. The electrode structure as claimed in claim 1, wherein the fourth conductive wire includes a first portion and two ends, the first portion is disposed between the two ends, an imaginary line passes through the two ends, and the first portion is offset from the imaginary line by a second distance, wherein the second distance is greater than or equal to 1 μm and less than or equal to 8 μm.

8. The electrode structure as claimed in claim 1, wherein the second conductive layer further has an additional conductive wire and intersects with the fourth conductive wire, and the isolation fourth conductive wire comprises a first portion and a second portion, the first portion does not overlap with the additional conductive wire, the second portion overlaps with the additional conductive wire, and a width of the second portion is greater than a width of the first portion.

9. The electrode structure as claimed in claim 1, wherein an edge portion of the fourth conductive wire has an arcuate profile.

10. The electrode structure as claimed in claim 1, wherein the first conductive layer further has a fifth conductive wire electrically connected to the first conductive wire and the second conductive wire, and an extension direction of the fifth conductive wire is parallel to an extension direction of the fourth conductive wire.

11. The electrode structure as claimed in claim 10, wherein the first conductive layer further has a sixth conductive wire electrically connected to the first conductive wire and the fifth conductive wire, and in the top view of the electrode structure, the sixth conductive wire is disposed between the third conductive wire and the fourth conductive wire.

12. The electrode structure as claimed in claim 11, wherein an extension direction of the sixth conductive wire is parallel to an extension direction of the third conductive wire.

13. The electrode structure as claimed in claim 1, wherein the second conductive layer further has a seventh conductive wire electrically connected to the second conductive wire, and the first conductive wire and the second conductive wire are disposed between the third conductive wire and the seventh conductive wire.

14. The electrode structure as claimed in claim 1, wherein the second conductive layer further has a seventh conductive wire spaced apart from the third conductive wire, and the third conductive wire is electrically connected to the seventh conductive wire via the first conductive wire and the second conductive wire.

15. The electrode structure as claimed in claim 14, wherein the electrode structure is configured to sense touch actions.

16. The electrode structure as claimed in claim 1, further comprising an insulating layer disposed between the first conductive layer and the second conductive layer, wherein a thickness of the first conductive layer is less than a thickness of the insulating layer.

17. The electrode structure as claimed in claim 1, wherein a first thickness of the first conductive layer is less than a second thickness of the second conductive layer.

18. The electrode structure as claimed in claim 17, wherein a ratio of the first thickness to the second thickness is greater than or equal to 0.6 and less than 1.

19. The electrode structure as claimed in claim 1, wherein the first conductive layer comprises four fourth conductive wires, an imaginary rectangle is formed by connecting center points of the four fourth conductive wires, and a portion of each four fourth conductive wires is offset towards a center of the imaginary rectangle.

20. A display device, comprising:
 a display panel; and
 an electrode structure, comprising:
  a first conductive layer having a first conductive wire, a second conductive wire and a fourth conductive wire, wherein the first conductive wire is electrically connected to the second conductive wire, and the fourth conductive wire is electrically insulated from the first conductive wire and the second conductive wire; and
  a second conductive layer disposed on the first conductive layer and having a third conductive wire, wherein the third conductive wire is electrically connected to the first conductive wire,
 wherein in a top view of the electrode structure, the fourth conductive wire is disposed between the first conductive wire and the second conductive wire,
 wherein the electrode structure is disposed on the display panel.

\* \* \* \* \*